United States Patent

Noble

(10) Patent No.: US 8,799,472 B2
(45) Date of Patent: Aug. 5, 2014

(54) PEER SIGNALING PROTOCOL AND SYSTEM FOR DECENTRALIZED TRAFFIC MANAGEMENT

(75) Inventor: Alan Noble, South Australia (AU)

(73) Assignee: Riverbed Technology, Inc., San Francisco, CA (US)

( * ) Notice: Subject to any disclaimer, the term of this patent is extended or adjusted under 35 U.S.C. 154(b) by 1856 days.

(21) Appl. No.: 11/242,540

(22) Filed: Oct. 3, 2005

(65) Prior Publication Data

US 2006/0072457 A1 Apr. 6, 2006

(30) Foreign Application Priority Data

Oct. 6, 2004 (AU) .................................. 2004905742

(51) Int. Cl.
*G06F 15/173* (2006.01)
*H04L 12/24* (2006.01)
*H04L 29/06* (2006.01)

(52) U.S. Cl.
CPC ............ *H04L 41/0893* (2013.01); *H04L 41/12* (2013.01); *H04L 69/24* (2013.01)
USPC .......................................... 709/226; 709/223

(58) Field of Classification Search
CPC ...... H04L 41/0893; H04L 41/12; H04L 69/24
USPC .................................................. 709/223, 226
See application file for complete search history.

(56) References Cited

U.S. PATENT DOCUMENTS

2007/0294410 A1 * 12/2007 Pandya et al. ................. 709/226

* cited by examiner

*Primary Examiner* — Hee Soo Kim
(74) *Attorney, Agent, or Firm* — Park, Vaughan, Fleming & Dowler LLP

(57) ABSTRACT

A network communications protocol to allow endpoints in a computer network to communicate their respective requirements for access to a network resource to each other, and to communicate a policy for access to the network resource by the endpoints. The network protocol may also allow negotiation of access to the network resource for the respective endpoint in accordance with the policy and the requirements information communicated by other endpoints. The network resource may be access to a WAN connection or an Internet connection, or may be a device such as a network printer or network attached storage.

23 Claims, 5 Drawing Sheets

| Signal | Type | Description |
| --- | --- | --- |
| transmit | Informational | Indicates that an endpoint is transmitting. Optionally includes priority, requested bandwidth and other information. |
| info | Informational | Indicates that an endpoint has new information to share, such as network statistics or the WAN data rate. |
| set | Command | Request to set a policy or other information, such as WAN data rate. |
| get | Command | Request to get information, such as network statistics or cached data. |
| pause | Command | Request to pause transmissions. |

Figure 3

| Field | Type | Description |
|---|---|---|
| PSP::Magic | 32-bit unsigned integer | Identifies start of header |
| PSP::MajorVersion | 4-bit unsigned integer | Major version, 1 initially |
| PSP::MinorVersion | 4-bit unsigned integer | Minor version, 0 initially |
| PSP::Operation | 8-bit unsigned integer | Specifies the operation |
| PSP::Digest | 160-bit binary string | Message digest (SHA-1) |
| PSP::HostPriority | 8-bit unsigned integer | Specifies the LAN host priority |
| PSP::AppPriority | 8-bit unsigned integer | Specifies application priority |
| PSP::Reserved | 16-bit unsigned integer | Reserved for future use |

Figure 4

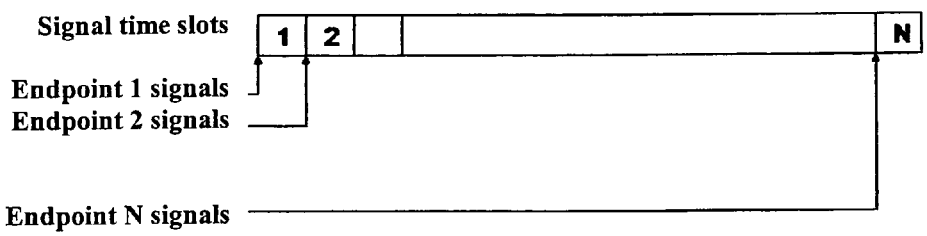

Figure 5

PEER SIGNALING PROTOCOL AND SYSTEM FOR DECENTRALIZED TRAFFIC MANAGEMENT

BACKGROUND OF THE INVENTION

The present invention relates to a method and a signalling protocol for decentralized ac management in a computer network.

Small networks, comprising multiple endpoint devices, such as desktop computers, notebook computers and handheld computers, usually share a link to the external network, such as the Internet or Wide Area Network (WAN), via a common access device, such as a DSL modem and/or router.

A common problem is that one endpoint can often occupy more than its fair share of the available bandwidth. This is particularly true when one or more endpoint users are downloading large files, while another endpoint user is attempting to use delay-sensitive networked applications, such as voice over IP (VoIP), video streaming or online games.

It is known to solve these problems by deploying a so-called traffic management appliance in series with the access device. These appliances are hardware devices that optimize network performance, through one or more of the following functions: traffic shaping, also known as bandwidth management or quality of service (QoS), compression, caching and protocol optimization. Alternatively, traffic management functions may be integrated into an existing networking device, such as a router, obviating the need for a separate device. However, traffic management hardware devices are expensive. Routers that implement traffic management functions are also expensive.

Network access devices found in small networks, however, are relatively inexpensive products lacking quality of service (QoS) capabilities. The cost of installing the additional hardware or more sophisticated network access devices that can implement traffic management is often prohibitive and also introduces another point of failure into the network.

It is an object of the present invention to provide a method and a signalling protocol for traffic management that overcomes or at least substantially amellorates the problems associated with the prior art Other objects and advantages of the present invention will become apparent from the following description, taken in connection with the accompanying drawings, wherein, by way of illustration and example, embodiments of the present invention are disclosed.

SUMMARY OF THE INVENTION

In one form of this invention there is proposed a network traffic management sylvan for managing traffic flows to a network resource including
- a plurality of endpoints adapted to send traffic to the network resource, means to set and communicate a policy for access to the network resource by said endpoints,
- a software agent associated with each of said endpoints adapted to communicate with each other said agent, and to negotiate access to the network resource for the respective endpoint in accordance with the policy and the information communicated by each other agent.

In a further form the invention may be said to reside in a method of shaping traffic presented to a network resource in a local area network including the steps of
- providing are agents at each of a plurality of network endpoints on a local area network, said agents being adapted to communicate with each other agent by signals passed over the local area network;
- providing at each endpoint means to regulate the traffic presented to the network resource by that endpoint;
- providing and communicating to each agent a policy for the allocation of use of the network resource among the plurality of endpoints;
- each agent communicating with each other agent to negotiate access to the network resource according to the policy and the communicated traffic requirements of each endpoint.

In a yet further form, the invention may be said to reside in a network communications protocol adapted to allow endpoints in a local area network to communicate their respective requirements for access to a shared network resource to each other.

In preference, the protocol includes means for endpoints to identify each others presence on the network.

In preference, the protocol includes means to communicate relative priority information between endpoints.

In preference, the protocol includes means to communicate a policy for access to the shared network resource among all endpoints.

In preference, there resides on the local area network at least one endpoint adapted to set and communicate said policy for access. This endpoint is called a manager.

In preference, the protocol includes means to communicate any or all of an endpoint's requested bandwidth, the data rate of the network resource, network statistics or network data.

In preference, the protocol includes means to implement a distributed cache amongst a plurality of endpoints.

In preference, the network endpoints are computing devices.

In preference, the network endpoints are client devices such as desktop computers, laptop computers and handheld computers.

In preference an endpoint is a computer server.

In preference an endpoint is a computer peripheral, such as a printer or scanner.

In preference the network resource is an access point to a wide area network.

In preference, the network resource is an access point to the Internet.

In preference, the policy for allocation of access to the network resource is a policy for allocation of a portion of bandwidth on a wide area network or Internet connection to each endpoint calculated as total available bandwidth available on the link divided by the number of endpoints.

In preference, the policy for allocation of access to the network resource is a policy for allocation of a portion of bandwidth on a wide area network or Internet connection to each endpoint, based on pre-set or communicated relative priority of each endpoint.

In preference, each endpoint includes means to implement the requirements of the policy by rate limiting.

In preference, the local area network may be a wireless network or a 3G network.

BRIEF DESCRIPTION OF THE DRAWINGS

For a better understanding of this invention it will now be described with respect to preferred embodiments which shall be described herein with the assistance of drawings wherein;

FIG. 3 is a table showing a basic set of protocol signals for an embodiment of the Peer Signalling Protocol of the invention; and FIG. 4 is a table setting out the header fields of the Protocol a the invention; and FIG. 5 illustrates time slicing for a synchronous embodiment of the invention.

DETAILED DESCRIPTION OF THE PREFERRED EMBODIMENTS

Figure 1:
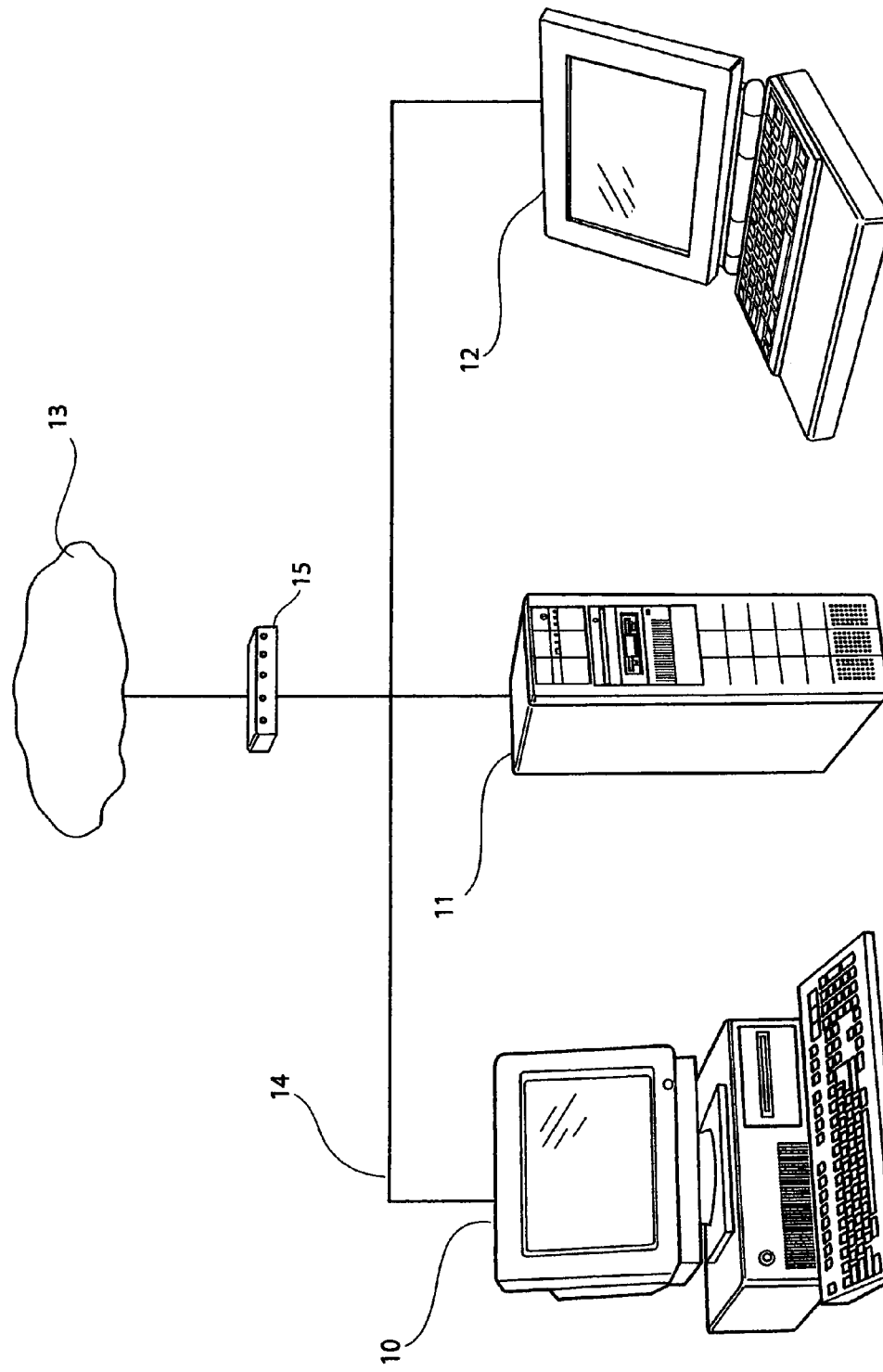
FIG. 1 is diagram of a local area network upon which the method and a signalling protocol for decentralized traffic management of the invention is implemented.

Now referring to the illustrations, and in particular to FIG. 1, there is shown a desktop computer 10, a server computer 11 and a laptop computer 12 These are network endpoints, which share access to an external network 13 via a local area network (LAN) 14 and a common access device, being a DSL modem and router 15. In other embodiments (not shown) the endpoints may be any computing devices and the common access device may be a router, cable modem or network switch. The external network 13 shown as a corporate wide area network (WAN), may be the Internet.

The network endpoints on the Local Area Network (LAN) signal each other so as negotiate access to the shared external network. The system thereby implements a virtual centralized traffic manager, by means of decentralized traffic management.

This is possible because of the large disparity between LAN and WAN data rates, which is typically 2 or 3 orders of magnitude. LAN data rates are between 100 Mbps and 10 Gbps, whereas WAN data rates are typically under 45 Mbps (T3) for a corporate WAN, or 1 Mbps for a typical DSL Internet link. In the time it takes to transmit 1 Mbyte of data over a 1 Mbps WAN link, 100 Mbytes of data can be transmitted over a 100 Mbps LAN, which is equivalent to one million 100-byte messages.

The high data rates of the LAN make it feasible to implement a signalling protocol between endpoints that enables endpoints to negotiate access to the WAN and adjust on the fly what they are transmitting over the WAN.

Essentially, the fast LAN is used as a signalling channel to control access to the much slower WAN. Signalling is the exchange of information been peer endpoints on a fast LAN to control access to a slower WAN. The large disparity in speed means that the bandwidth used by the signalling does not have a detrimental effect on the data rate presented to the WAN.

Figure 2:
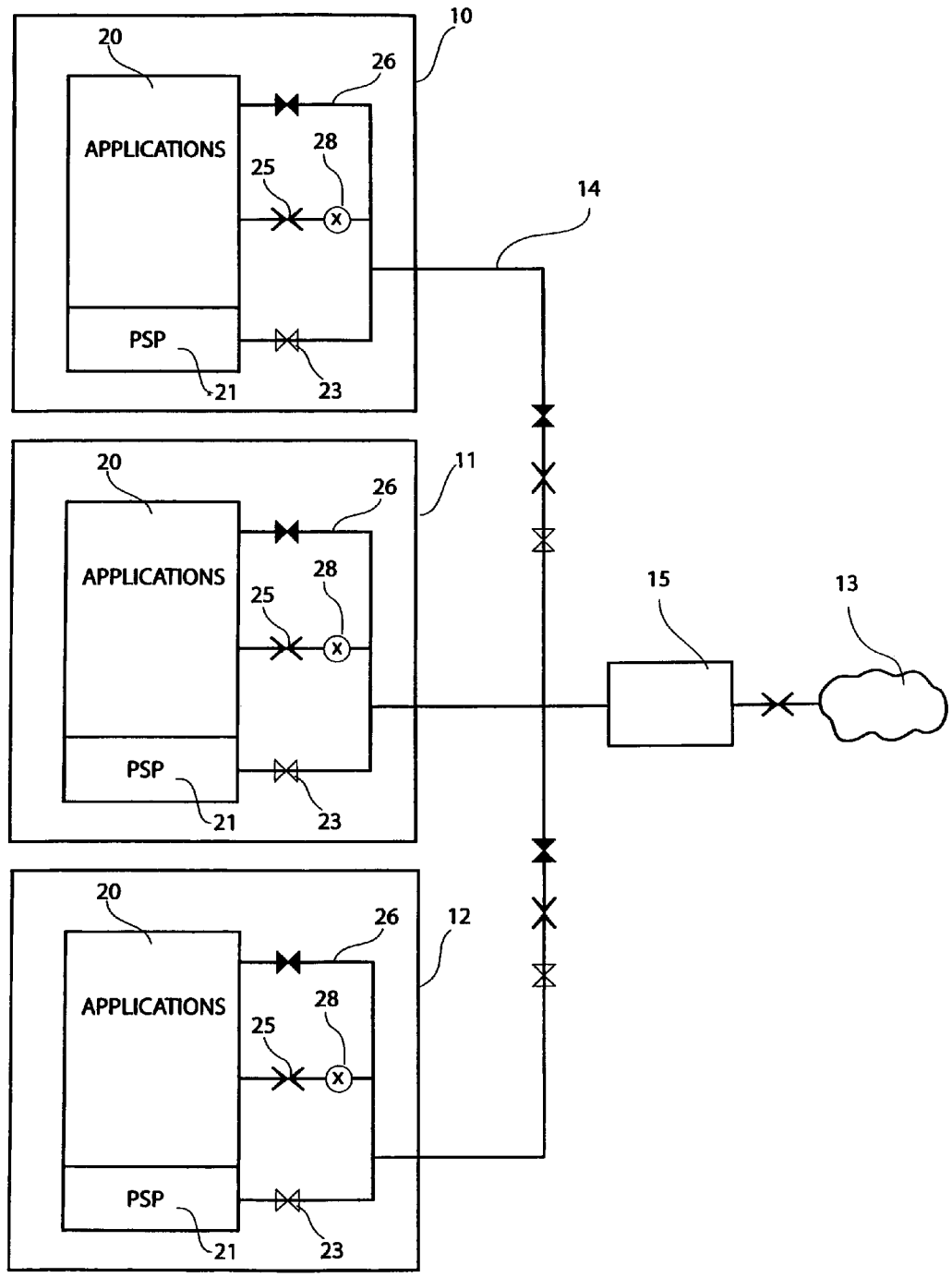
FIG. 2 is a diagram of the network of FIG. 1, showing data flows when the invention is implemented.

FIG. 2 is a logical block diagram of the system of FIG. 1.

As illustrated in FIG. 2, each endpoint includes software modules 21 to implement a decentralized traffic management system. These software modules communicate by sending data signals 23 to each other across the LAN 14. This data comprises signals 23 which implement the Peer Signalling Protocol (PSP) of the invention. Each endpoint so equipped 10, 11, 12 is referred to as a PSP host, and all PSP hosts are peers. There is a distributed system in which endpoints emulate and perform the functions of a centralized traffic management appliance.

Applications running on the endpoints communicate data 25 which is carried by the WAN and also data 26 which is carried only by the LAN.

Endpoints signal their network traffic requirements to their peers, and each endpoint listens for the PSP signals from other peers.

In order to send and receive data over the WAN, each endpoint must gain access to the WAN bandwidth.

Endpoints negotiate their use of WAN bandwidth according to a policy. In policy-based networking such as this, a policy is a formal set of statements that define how the network's resources are to be allocated among network users, hosts, applications and other devices. The policy may be static and pre-configured, or dynamic and communicated via the signalling protocol or another mechanism.

One or more of the endpoints may be designated managers. These determine and broadcast the policy in effect to their peers.

In the absence of a manager, there may be a default (pre-defined) policy, such as, "highest priority host gets 50% of the bandwidth". Note that while the use of a manager centralizes the policy control, the policy enforcement is decentralized. Each endpoint controls the rate at which it send data to the WAN itself, in response to the set policy. This control is performed by a rate limiter 28.

The major signals of this protocol are shown in FIG. 3, but many more may be contemplated. As shown in the figure the signals are as follows:

transmit

There are two defined time periods, TransmitPeriod and TransmitWait All PSP hosts, while attempting to transmit traffic regularly broadcast a transmit messages every TransmitPeriod milliseconds, providing another host with higher priority has not transmitted during the last TransmitPeriod milliseconds. A PSP host will refrain from broadcasting transmit messages if another host with higher priority is transmitting. A transmit message may not be broadcast less than TransmitWait milliseconds prior to the last message.

The body of to transmit message may specify parameters, such as the requested bandwidth, priority, and other information as required, or it may be empty.

set

The set operation is sent out by a PSP Manager to establish a policy. A PSP Manager is an endpoint configured to load and deploy policies. The body of the set message contains the policy to be established.

In the illustrated embodiment, the default policy is for a lower priority host to simply back off in the presence of traffic from a higher priority host info The info operation indicates that an endpoint has new information to share, such as network statistics or the WAN data rate.

get

This is sent as a request to get information, such as network statistics or cached data.

pause

This is sent to request an endpoint or endpoints to pause transmissions.

In the illustrated embodiment, PSP is a UDP-based broadcast protocol. The PSP header is shown in FIG. 4.

All integers are in standard network representation.

Over Ethernet, the minimum PSP packet is 70 bytes (560 bits), broken down as follows:

| OSI Layer | Header | Size |
| --- | --- | --- |
| Layer 5 | PSP header | 30 bytes |
| Layer 4 | UDP header | 8 bytes |

-continued

| OSI Layer | Header | Size |
|---|---|---|
| Layer 3 | IP header | 20 bytes |
| Layer 2 | Ethernet frame | 12 bytes |

It can be seen, for example, that 100 hosts broadcasting 10 times/second generate 560 kbps of LAN traffic, i.e., less than 1% of the capacity of a 100 Mbps LAN. The transmission time for each signal is 5.6 microseconds. The usage of LAN resources does not therefore impact on the capacity of the LAN to present data to the WAN at the full speed which the WAN can accept.

The system flexibly partitions the WAN bandwidth among the endpoints. The exact partitioning of bandwidth depends on the installed policy, and may be fair or unfair, static or dynamic. The goal of the system is to ensure that the sum of the endpoint data rates is always equal to the overall WAN data rate, $R_{WAN}$, as specified by the following rate equation.

$$\sum_{i=1}^{N} Ri = R_{WAN}$$

where there are N endpoints, Ri is the rate of endpoint i and $R_{WAN}$ is the WAN data rate. The system attempts to maintain the equality of the left and right sides of the rate equation in both send and receive directions at all times. Each endpoint enforces its rate, Ri, by means of a bidirectional rate limiter 28 that controls the maximum rate of traffic sent and received. The rate limiter need only limit traffic 25 sent to or received from the WAN, not traffic 26 that is internal to the LAN.

If the sum of the endpoint rates is less than the actual WAN data rate means that WAN bandwidth is under utilized. If the sum is greater than the actual WAN data rate that means that the WAN link is over utilized or congested. A congested WAN link means that endpoints are competing for bandwidth, rather than negotiating a guaranteed share of the bandwidth.

For example, a fair, static partitioning across N endpoints simply limits each endpoint to precisely $1/N^{th}$ of the WAN data rate, i.e.:

$$R_1 = R_2 = R_3 \ldots = R_n = (R_{WAN}/N)$$

An unfair, static portioning allocates different rates to each endpoint, while nevertheless maintaining the equality of the rate equation.

Static partitioning can be implemented without any form of signalling but results in wasted bandwidth whenever one or more of the endpoints require less than their share.

A dynamic partitioning scheme allocates bandwidth across the subset of endpoints that are actually transmitting at any given time.

Endpoints can determine what other endpoints are transmitting either implicity by sniffing what is on the physical network or explicitly via signalling. In the invention, endpoints broadcast or multicast PSP transmit signals periodically whenever they are transmitting. By counting the number of transmitters present during a given interval, the system can determine the total number of endpoints that are currently transmitting and partition bandwidth accordingly.

Further, by including a host priority the transmit signal, lower-priority endpoints can be configured to back off transmitting either partially or completely in the presence of high-priority traffic. This can be used to implement a form of priority queuing.

A further embodiment includes an application priority in the transmit signal to enable priority queuing by software application, either in combination with host priority or independently.

A further embodiment includes an endpoint's requested bandwidth in the transmit message. The requested bandwidth can be pre-configured or can be computed dynamically by summing the minimum required bandwidth required for each networked application running on a given endpoint. The minimum required bandwidth for each application can be specified in the policy. Prior art techniques, such as windows-based traffic management, can be used to determine what networked application are running on a given endpoint at a given time. The system will then attempt to allocate each endpoint its requested bandwidth in order of priority. Each endpoint first sums the requested bandwidth from each transmit signal. If more bandwidth is requested than is available, endpoints will renegotiate their bandwidth requirements according to the installed policy and re-transmit accordingly. For example, one policy could require endpoints to proportionally reduce their requested bandwidth, i.e., in a pro rata fashion. Another, policy could require low-priority endpoints to temporarily stop transmitting.

A further embodiment specifies a minimum guaranteed bandwidth for each endpoint, but permits endpoints to burst above their minimum if not all of the WAN link is being utilized. Endpoints signal their intent to use additional bandwidth, to avoid multiple endpoints from attempting to over-allocate bandwidth.

An embodiment with improved efficiency can be implemented by synchronizing the system time of each endpoint and assigning each endpoint a unique signalling time slot, as described in FIG. 5. For example, if there are 100 endpoints transmitting 10 times/second (i.e., every 100 milliseconds) then signals can be spread out every millisecond. Synchronization can be performed via a standard synchronization protocol, such as Network Time Protocol (NTP).

Endpoints periodically determine the WAN data rate, i.e., the speed of the WAN link. The WAN data rate may be dynamic (vary over time).

In order to share the WAN bandwidth, it is first necessary for the system to know the WAN data rate (WAN link speed). Further, certain WAN technologies, such as Frame Relay, have variable data rates. In such cases the system must distinguish between the minimum guaranteed rate, sometimes called the Committed Information Rate (CIR), and the maximum access rate, sometimes called the Excess Information Rate (EIR).

When the WAN data rate is static and known ahead of time, endpoints can be simply pre-configured with this information via the installed policy.

When the WAN data rate is dynamic or static but unknown, it must be computed. The system computes the data rate by performing a speed test. Prior art describes speed testing for a single host. The method herein is for performing speed testing in a distributed system. The speed test involves transferring data to or from one or more known fast servers, herein known as speed test servers. (On the Internet, there are pubic speed test servers, such as DSLreports.com. It is also possible to set up and use a speed test server on a corporate network.)

The data rate is computed by clocking the data transfer and dividing the data size in bits by the transfer time in seconds minus connection/disconnection time (If using TCP or another connection-oriented protocol. The key requirement is that there is sufficient data and both the sending and receiving hosts are sufficiently fast to completely saturate the WAN link.

Several methods may be used to compute the WAN data rate in a peer signalling system, two of which are described below.

In the dedicated speed test, a designated endpoint, known as the tester, requests other endpoints to briefly pause transmitting, then performs a speed test. The tester first sends a pause signal to the other endpoints to request quiet time. Endpoints receiving a pause interpret may elect to delay or ignore the pause request. Therefore the tester must wait until all other endpoints cease transmitting, or give up and try again later if transmissions continue unabated. Once the network is quiet the tester performs a speed test, possibly in both directions. Upon computing the WAN data rate, which typically takes no more than a couple of seconds, the tester communicates the results via the info or set signal.

In a system with a designated manager, the manager listens for info signals and will set the new WAN data rate.

In the piggyback speed test, the speed test is performed by clocking part of an exiting data transfer. Any endpoint can perform the test providing the following two conditions are met:
1) no other endpoints transmit during the speed test (determined by absence of other transmit signals)
2) the data transfer saturates the WAN data link Upon successfully completing the speed test, the results are communicated via the info or set signal.

For example, a piggyback speed test may be combined with downloading an operating system update or updating a local cache.

There is a variety of prior-art techniques for determining when a WAN link is saturated. For example, one active measurement technique involves injecting multiple Internet Control Message Protocol (ICMP) 'ping' packets into the WAN and measuring inner-packet delay, round trip times, and packet losses. The speed test server may also be utilized for performing active measurements.

Endpoints that implement the peer signalling protocol are referred to as signalling devices. In a fully managed LAN, all endpoints should be configured to be signalling, to ensure that the traffic contributed by all endpoints is taken into account. Traffic originating from signaling devices can be identified by signing packets, namely, adding a signature to each packet.

One signing technique is packet colouring or packet marking, i.e., writing specific packet header fields, for example, the IP Layer 3 Type of Service (ToS) or Differentiated Services (DiffServ) field. Marks may be altered dynamically to minimize the risk of spoofing by non-signaling devices.

Another signing technique is encapsulation, which involves encapsulating the entire packet within another protocol, for example, by using Generic Routing Encapsulation (GRE). While the main use of GRE is to route IP packets between private IP networks across an internet, It is also feasible to encapsulate packets over a LAN. Further, the encapsulation may include a digital signature for strong security.

Conversely, non-signalling endpoints will not sign packets, and can therefore be identified by the absence of a packet signature, i.e., the correct packet mark or encapsulation.

Each endpoint in the system may be optionally configured to store data that is requested from a data source via the WAN, thereby creating a distributed cache. Endpoints requesting data via the WAN can first request if data is available from one of their peers via a get signal. If a peer already has the data, the data can fetched quickly via the LAN, thereby eliminating redundant data transfers via the slower WAN.

Each endpoint in the system may optionally store numerous network statistics, such as bandwidth, round-trip time, latency, etc. Statistics for the system as a whole can then be aggregated to one or more designated reporter, specified by the policy. The reporter may be local to the LAN or accessible via the WAN. A possible aggregation method is Push-based aggregation wherein each endpoint will periodically push statistics to the reporter via an info signal.

Alternatively Query-based aggregation may be used wherein The reporter will periodically query each endpoint with a get signal and request the latest statistics.

Figure 6:
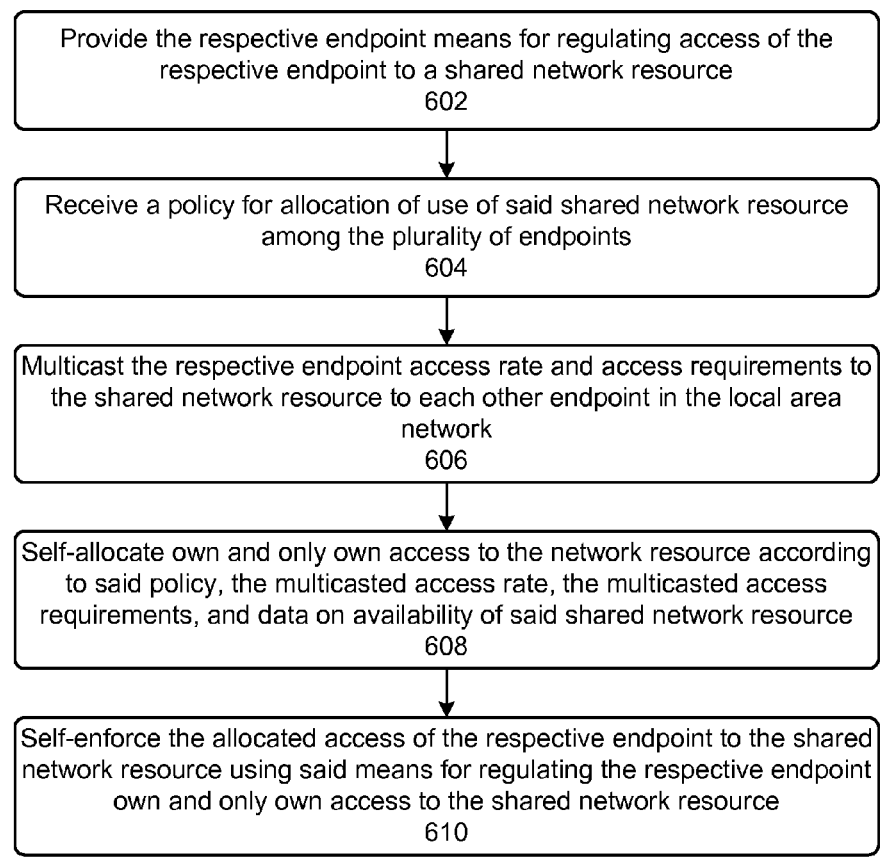
FIG. 6 illustrates a process for decentralized traffic management in accordance with an embodiment of the invention.

Each endpoint in the system may be optionally configured via the installed policy to detect and respond to anomalous network conditions. For example, so-called port scanning or Denial of Service (DOS) style attacks, resulting in hosts creating and destroying large numbers of connections per second, are characteristic of network viruses. Such conditions can be detected and trigger self-policing behavior, for example, rate limiting some or all traffic originating from the infected host. FIG. 6 illustrates a process for decentralized traffic management in accordance with an embodiment of the invention. The process can include the following operations: provide the respective endpoint means for regulating access of the respective endpoint to a shared network resource (operation 602), receive a policy for allocation of use of said shared network resource among the plurality of endpoints (operation 604), multicast the respective endpoint access rate and access requirements to the shared network resource to each other endpoint in the local area network (operation 606), self-allocate own and only own access to the network resource according to said policy, the multicasted access rate, the multicasted access requirements, and data on availability of said shared network resource (operation 608), and self-enforce the allocated access of the respective endpoint to the shared network resource using said means for regulating the respective endpoint own and only own access to the shared network resource (operation 610).

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A method for each endpoint of a plurality of endpoints in a decentralized local area network, each endpoint communicating with each other endpoint in the network by signals passing over the local area network, the method comprising:
   (a) providing the respective endpoint means for regulating access of the respective endpoint to a shared network resource;
   (b) receiving a policy for allocation of use of said shared network resource among the plurality of endpoints;
   (c) multicasting the respective endpoint access rate and access requirements to the shared network resource to each other endpoint in the local area network;
   (d) self-allocating own and only own access to the network resource according to said policy, the multicasted access rate, the multicasted access requirements, and data on availability of said shared network resource; and
   (e) self-enforcing the allocated access of the respective endpoint to the shared network resource using said means for regulating the respective endpoint own and only own access to the shared network resource.

2. The method of claim 1 wherein the endpoint has means to identify presence of other endpoints on the network.

3. The method of claim 1 wherein said policy includes relative priority between endpoints.

4. The method of claim 1 wherein the method further includes communicating any or all of an endpoint requested bandwidth, the data rate of the network resource, network statistics and network data.

5. The method of claim 1 wherein a distributed cache is implemented amongst a plurality of endpoints.

6. The method of claim 1 wherein the network resource is an access point to a wide area network.

7. The method of claim 1 wherein the network resource is an access point to the internet.

8. The method of claim 1 wherein the policy for allocation to the network resource is a policy for allocation of a portion of bandwidth on a wide area network or internet connection to each endpoint, calculated as total available bandwidth available on the link divided by the number of endpoints.

9. The method of claim 1 wherein the policy for allocation of access to the network resource is a policy for allocation of a portion of bandwidth on a wide area network or internet connection to each endpoint, based on pre-set or communicated relative priority of each endpoint.

10. The method of claim 1 wherein there resides on the local area network at least one endpoint adapted to set and communicate said policy for access.

11. The method of claim 1 wherein the local area network is a wireless network or a 3G mobile telephony network.

12. The method of claim 1 wherein the method further comprising the step of installing a software agent for resource management in the respective endpoint.

13. The method of claim 1 wherein the plurality of endpoints includes at least three endpoints.

14. The method of claim 1 wherein the data rate in the local area network is at least two orders of magnitude higher than the data rate of the traffic to be presented to the shared network resource.

15. The method of claim 1 wherein the method further includes enabling priority queuing between software applications executed by the respective endpoint.

16. An endpoint in a decentralized network traffic management system for managing traffic flows to a shared network resource, the endpoint being one of a plurality of endpoints in a local area network, the endpoint including:
　(a) means for regulating rate of access of the respective endpoint to the shared network resource; and
　(b) a software agent associated with the respective endpoint, said software agent configured for:
　　(i) receiving a policy for allocation of use of said shared network resource among the plurality of endpoints;
　　(ii) multicasting the respective endpoint access rate and access requirements to the shared network resource to each other endpoint in the local area network;
　　(iii) self-allocating access of the respective endpoint to the network resource in accordance with the policy and the endpoint access rate and access requirements to the shared network resource communicated by all agents in the network; and
　　(iv) self-enforcing the allocated access of only the respective endpoint using said means for regulating rate of own and only own access of the respective endpoint to the shared network resource.

17. The endpoint of claim 16 wherein the plurality of endpoints is consisted of computing devices.

18. The endpoint of claim 16 wherein the plurality of endpoints is consisted of client devices.

19. The endpoint of claim 16 wherein at least one of the plurality of endpoints is a computer server.

20. The endpoint of claim 16 wherein at least one of the plurality of endpoints is a computer peripheral.

21. The endpoint of claim 16 wherein the local area network is a wireless network or a 3G mobile telephony network.

22. The endpoint of claim 18 wherein the client devices are selected from the group consisting of desktop computers, laptop computers and handheld computers.

23. The endpoint of claim 20 wherein the computer peripheral is selected from the group consisting of printers and scanners.

* * * * *